United States Patent
Badiru et al.

(10) Patent No.: US 12,344,307 B2
(45) Date of Patent: Jul. 1, 2025

(54) STEER-BY-WIRE SYSTEM FOR A VEHICLE PROVIDING SYNTHETIC CHASSIS UNDERSTEER BASED ON STEERING RACK LOAD

(71) Applicant: GM GLOBAL TECHNOLOGY OPERATIONS LLC, Detroit, MI (US)

(72) Inventors: Ibrahim A. Badiru, Novi, MI (US); Gabriel de Paula Eduardo, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 18/319,980

(22) Filed: May 18, 2023

(65) Prior Publication Data

US 2024/0383532 A1 Nov. 21, 2024

(51) Int. Cl.
*B62D 15/02* (2006.01)
*B62D 3/12* (2006.01)
*B62D 5/04* (2006.01)
*B62D 6/00* (2006.01)

(52) U.S. Cl.
CPC ............ *B62D 15/025* (2013.01); *B62D 3/12* (2013.01); *B62D 5/0421* (2013.01); *B62D 5/0463* (2013.01); *B62D 6/002* (2013.01); *B62D 6/003* (2013.01); *B62D 6/007* (2013.01); *B62D 6/008* (2013.01)

(58) Field of Classification Search
CPC ...... B62D 15/025; B62D 3/12; B62D 5/0421; B62D 5/0463; B62D 6/002; B62D 6/003; B62D 6/007; B62D 6/008
See application file for complete search history.

(56) References Cited

U.S. PATENT DOCUMENTS

| | | | |
|---|---|---|---|
| 6,662,898 B1 * | 12/2003 | Mattson | B62D 6/04 180/443 |
| 2005/0222731 A1 * | 10/2005 | Ghoneim | B60T 8/17555 180/408 |
| 2005/0228564 A1 * | 10/2005 | Kato | B62D 6/008 701/91 |
| 2012/0109458 A1 * | 5/2012 | Sidlosky | B60T 8/17551 701/41 |
| 2012/0130612 A1 * | 5/2012 | Watanabe | B60T 8/17554 701/70 |
| 2021/0188252 A1 * | 6/2021 | Lu | B60W 40/12 |
| 2021/0213935 A1 * | 7/2021 | Lu | B60C 23/04 |
| 2022/0396247 A1 * | 12/2022 | Carr, Jr. | B60W 40/068 |
| 2023/0174143 A1 * | 6/2023 | Ghoneim | B62D 5/0463 180/443 |
| 2024/0383522 A1 * | 11/2024 | Allan | B62D 6/008 |

* cited by examiner

*Primary Examiner* — Phutthiwat Wongwian
*Assistant Examiner* — Susan E Scharpf

(57) ABSTRACT

A steer-by-wire system of a vehicle is disclosed. The steer-by-wire system includes: sensors configured to detect parameters including at least one of a steering rack load on a steering rack of the vehicle and a speed of the vehicle; and a control module configured to operate in a synthetic chassis understeer mode including i) determining a change in road wheel angle based on the parameters, and ii) based on the change in the road wheel angle, controlling a motor to adjust a position of the steering rack to at least one of introduce and increase understeer.

20 Claims, 6 Drawing Sheets

STEER-BY-WIRE SYSTEM FOR A VEHICLE PROVIDING SYNTHETIC CHASSIS UNDERSTEER BASED ON STEERING RACK LOAD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to steer-by-wire systems for vehicular applications.

A steer-by wire system can include a steering wheel that is used by a driver to provide a steering request angle. A sensor detects the requested steering angle and a controller, in response to the requested steering angle, controls a motor of a steering rack to turn wheels of the vehicle connected to the steering rack. The steering wheel is not mechanically connected to the steering rack, as with a traditional steering system.

SUMMARY

A steer-by-wire system of a vehicle is disclosed. The steer-by-wire system includes: sensors configured to detect parameters including at least one of a steering rack load on a steering rack of the vehicle and a speed of the vehicle; and a control module configured to operate in a synthetic chassis understeer mode including i) determining a change in road wheel angle based on the parameters, and ii) based on the change in the road wheel angle, controlling a motor to adjust a position of the steering rack to at least one of introduce and increase understeer.

In other features, the control module is configured to determine whether to operate in the synthetic chassis understeer mode based on the parameters.

In other features, the control module is configured to determine the change in the road wheel angle based on the steering rack load and the speed of the vehicle.

In other features, the control module is configured to estimate the steering rack load based on a steering wheel angle, the speed of the vehicle, and mass of the vehicle.

In other features, the steer-by-wire system further includes a steering rack load sensor configured to detect the steering rack load on the steering rack.

In other features, the control module is configured to sum a steering wheel angle request with the change in the road wheel angle to provide an adjusted road wheel angle, and convert the adjusted road wheel angle to a target position for the steering rack.

In other features, the control module is configured to determine the change in the road wheel angle based on at least one of a virtual deflection understeer table and a virtual deflection understeer plot.

In other features, control module is configured to adjust values of the at least one of the virtual deflection understeer table and the virtual deflection understeer plot based on the speed of the vehicle and steering rack position authority limits.

In other features, the control module is configured to adjust the change in the road wheel angle based on a scalar gain percentage, the scalar gain percentage being set based on the speed of the vehicle.

In other features, the control module is configured to delay adjusting the position of the steering rack using a first order filter.

In other features, a method of operating a steer-by-wire system of a vehicle is disclosed. The method includes: detecting parameters including at least one of a steering rack load on a steering rack of the vehicle and a speed of the vehicle; and operating in a synthetic chassis understeer mode including i) determining a change in road wheel angle based on the parameters, and ii) based on the change in the road wheel angle, controlling a motor to adjust a position of the steering rack to at least one of introduce and increase understeer.

In other features, the method further includes determining whether to operate in the synthetic chassis understeer mode based on the parameters.

In other features, the method further includes determining the change in the road wheel angle based on the steering rack load and the speed of the vehicle.

In other features, the method further includes estimating the steering rack load based on a steering wheel angle, the speed of the vehicle, and mass of the vehicle.

In other features, the method further includes detecting the steering rack load on the steering rack via a steering rack load sensor.

In other features, the method further includes: summing a steering wheel angle request with the change in the road wheel angle to provide an adjusted road wheel angle; and converting the adjusted road wheel angle to a target position for the steering rack.

In other features, the method further includes determining the change in the road wheel angle based on at least one of a virtual deflection understeer table and a virtual deflection understeer plot.

In other features, the method further includes adjusting values of the at least one of the virtual deflection understeer table and the virtual deflection understeer plot based on the speed of the vehicle and steering rack position authority limits.

In other features, the method further includes adjusting the change in the road wheel angle based on a scalar gain percentage, the scalar gain percentage being set based on the speed of the vehicle.

In other features, the method further includes delaying adjustment of the position of the steering rack using a first order filter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
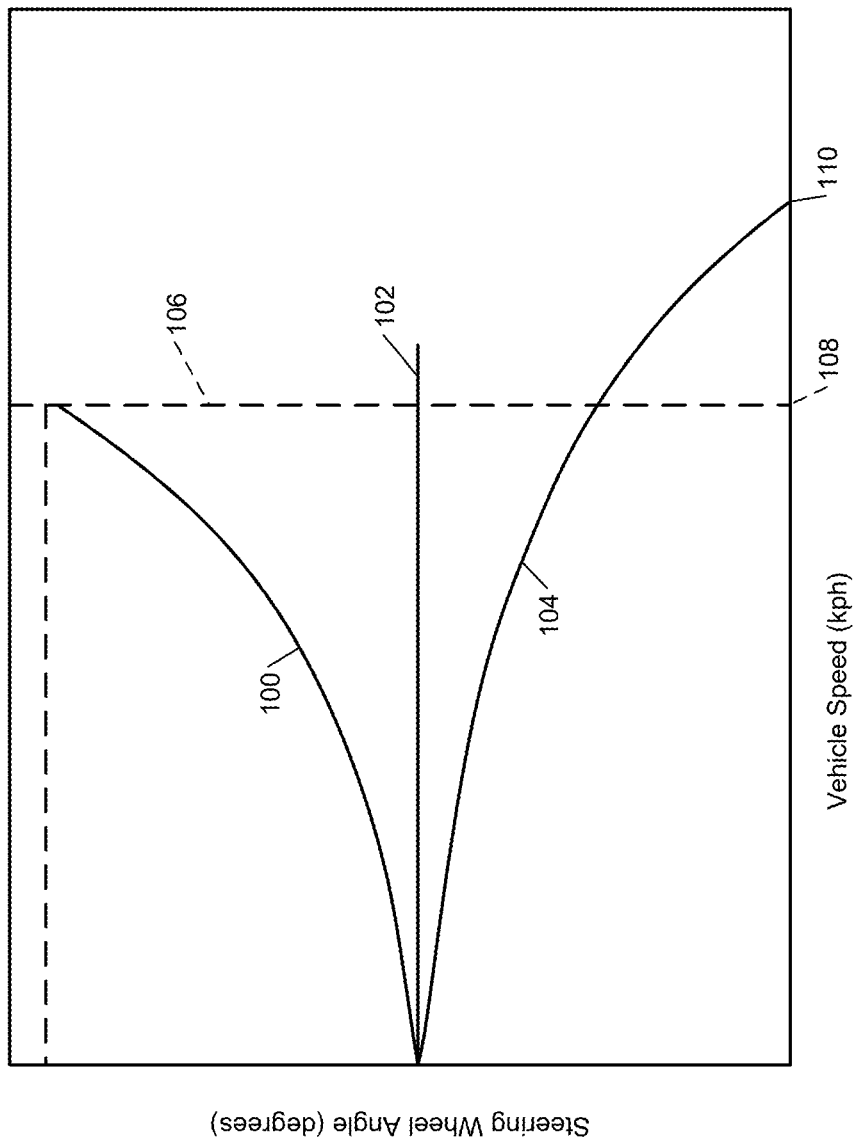
FIG. 1 shows a plot of steering wheel angle versus vehicle speed illustrating aspects of understeer, neutral steer, and oversteer.

Vehicle understeer can be provided for handling and safety reasons. A traditional vehicle includes a steering system with bushings, such as inner and outer tie rod bushings and stabilizer bar bushings. These bushings are compliant and tend to provide at least some level of understeer. When a driver drives the vehicle into a turn and the vehicle is not turning as quickly as the driver intended (i.e., the vehicle is moving radially outward of an intended path), understeer is experienced, and the driver simply turns the steering wheel more to correct the path of the vehicle to follow the intended path. The turning of the steering wheel more to increase the turning angle tends to happen intuitively by an untrained driver. This is unlike an oversteer event, in which case, the vehicle turns quicker (or more) than intended. In an oversteer event, the driver needs to counter steer (i.e., turn the steering wheel less) to correct the vehicle path. This is not an intuitive driver behavior and is less likely to be performed by an untrained driver. A race car driver is trained to understand when an oversteer event is occurring and to counter steer.

Traditionally, understeer characteristics are provided by compliant steering system bushings of a vehicle during a turning event due to traction forces experienced between tires of the vehicle and road surface. The understeer characteristics cause road wheel angle to change such that the steered wheels turn in a direction away from the direction the vehicle is turning (i.e., the road wheel angle is smaller than intended). Road wheel angle refers to the angle of wheels of the vehicle relative to a longitudinal (or X) axis of the vehicle. For example, when a wheel is not turned, a longitudinal axis of the wheel, which extends radially along a diameter of the wheel and parallel to a road surface, is at 0°. When not turned, the longitudinal axis of the wheel extends parallel to a longitudinal (or X) axis of the vehicle. When the wheel is turned to the right, the longitudinal axis of the wheel is at a positive angle relative to the longitudinal axis of the vehicle. When the wheel is turned to the left, the longitudinal axis of the wheel is at a negative angle relative to the longitudinal axis of the vehicle.

For certain situations, it can be desirable to increase the amount of understeer and/or to introduce understeer. This may occur, for example, when the bushings of a vehicle are less compliant then needed to provide a predetermined level of understeer. As another example, introduction of understeer can be desirable when a vehicle does not include compliant bushings.

The examples set forth herein include steer-by-wire systems that are configured to operate in a synthetic chassis understeer mode. The term "synthetic" is used to indicate that understeer is provided not by passive mechanical devices, but rather by electronically modifying the road wheel angle of the wheels of the vehicle based on certain parameters to introduce and/or increase a level of understeer. This is unlike understeer traditionally provided using passive mechanical devices, such as compliant bushings.

During the synthetic chassis understeer mode, understeer may be supplemented and/or introduced. For example, if a vehicle has compliant bushings providing a level of understeer, the provided level of understeer may be increased (i.e., supplemented) by the steer-by-wire system. By electronically supplementing the amount of understeer, more understeer is provided than the bushings are able to provide alone.

If the vehicle does not include compliant bushings and/or the bushings of the vehicle are not compliant, then understeer is introduced. The amount of understeer supplemented and/or introduced may be less than, the same, or greater than the amount of understeer provided by a baseline steering system having compliant bushings. When understeer is introduced in a vehicle not having compliant bushings and/or bushings that are not compliant and when the amount of understeer introduced is the same as that provided by compliant bushings of a baseline steering system, the steering-by-wire system is said to be mimicking the baseline steering system.

FIG. 1 shows a plot of steering wheel angle versus vehicle speed illustrating aspects of understeer, neutral steer, and oversteer. Vehicle speed may be measured, for example, in kilometers per hour (kph). An understeer curve 100, a neutral steer curve 102, and an oversteer curve 104 are shown. According to the plot, as vehicle speed increases, a driver experiencing an understeer event needs to increase steering angle to keep the corresponding vehicle on an intended (or target) path of a turn. When experiencing a neutral steer event, the driver can hold the steering wheel angle at a same angle and the vehicle follows the intended (or target) path of a turn. When experiencing an oversteer event, the driver needs to reduce the steering wheel angle to follow the intended (or target) path of a turn. Vertical dashed line 106 refers to a characteristic speed 108 at which the steer angle required to negotiate any turn is equal to twice the Ackermann angle (i.e., the angle required in a Neutral Steer Vehicle). A critical speed 110 is a speed at which the vehicle control sensitivity goes to infinity and may be prone to "spin out" in an oversteer event.

Figure 2:
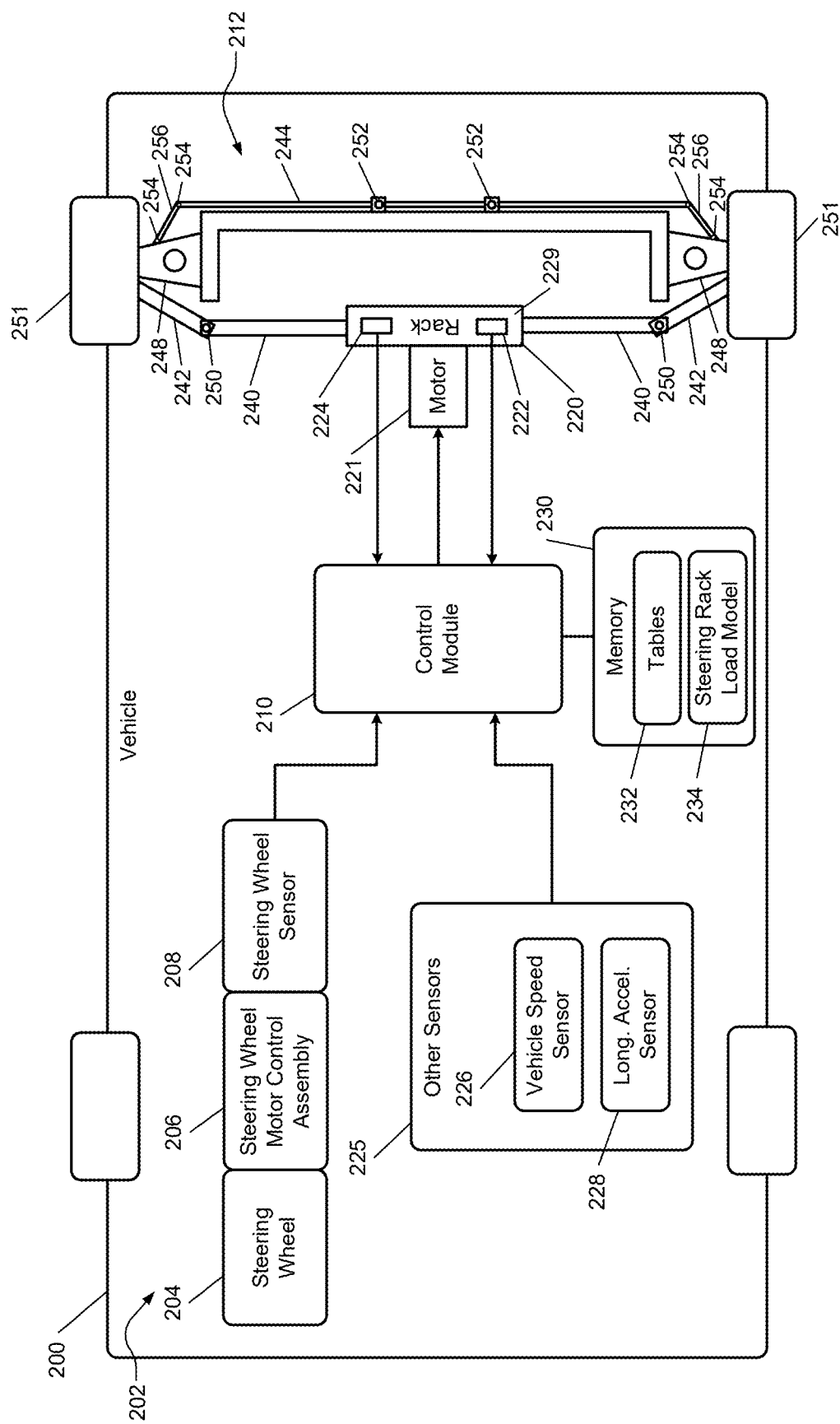
FIG. 2 is a functional block diagram of a vehicle including an example steer-by-wire system providing synthetic chassis understeer in accordance with the present disclosure.

FIG. 2 shows a vehicle 200 including a steer-by-wire system 202 providing synthetic chassis understeer. The steer-by-wire system 202 may include a steering wheel 204, a steering wheel motor control assembly 206, a steering wheel sensor 208, a control module 210, and a suspension system 212. The steering wheel 204 is used to provide a steering angle request. The steering wheel motor control assembly 206 controls resistance and positioning of the steering wheel 204. The steering wheel sensor 208 detects the rotational position of the steering wheel 204. The control module 210 controls position of a steering rack 220 via a motor 221 based on the output of the steering wheel sensor 208, a force sensor 222, a steering rack position sensor 224, and/or output(s) from one or more other sensors 225, such as a vehicle speed sensor 226 and a longitudinal acceleration sensor (e.g., an accelerometer measuring longitudinal acceleration) 228. The position of the steering rack 220 refers to the positioning of tie rods 240, 242 relative to a body 229 of the steering rack 220. By adjusting the positions of the tie rods 240, 242, the road wheel angle of the wheels 251 changes. The body 229 is fixed to a frame of the vehicle 200. One or more vehicle speed sensors may be included. One of the vehicle speed sensors may be onboard and directly measure vehicle speed. Vehicle speed may also be determined (or estimated) indirectly via, for example, a global positioning system.

In one embodiment, the control module 210 controls the position of the steering rack 220 based on outputs of the sensors 208, 222, and 226. In another embodiment, control module 210 controls the position of the steering rack 220 based on outputs of the sensors 208, 222, and 226 and one or more other sensors, such as one or more of the sensors 224 and 228.

Figure 4:
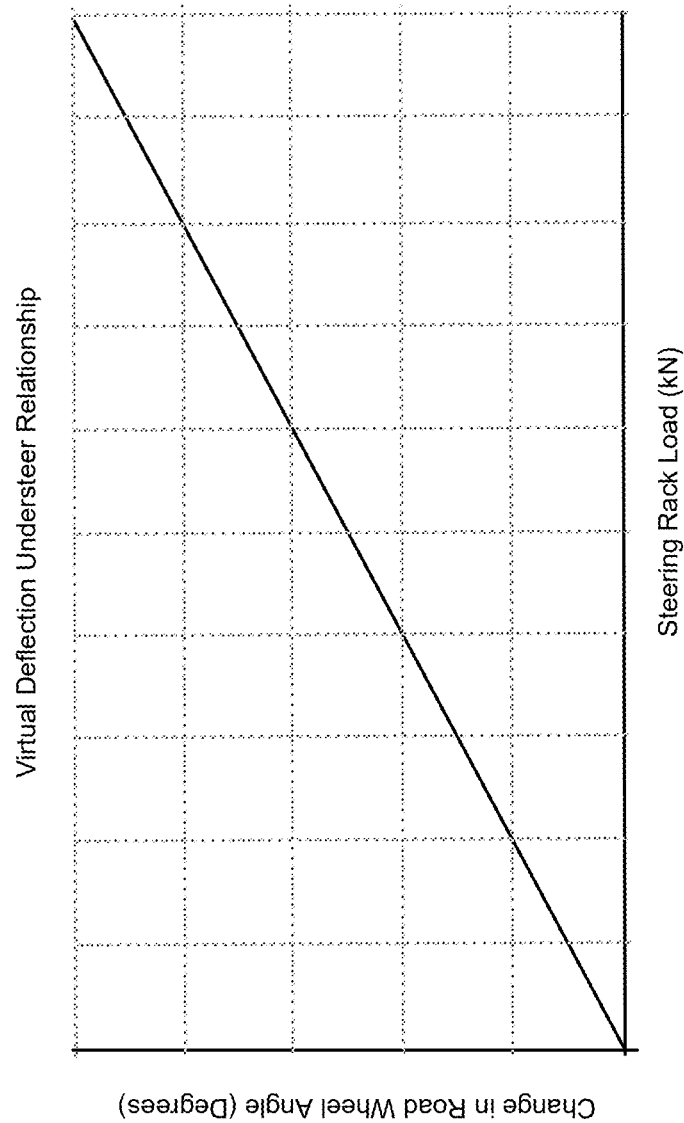
FIG. 4 is a portion of virtual deflection understeer plot including a curve relating change in road wheel angle to steering rack load in accordance with the present disclosure.

A memory 230 may be connected to the control module 210 and store: tables 232, such as, a virtual deflection understeer (VDU) table (or plot), a speed based scalar gain table (or plot), and a first order filter table (or plot); and a steering rack load model 234. These steering rack load model 234 provides an estimate of steering rack load based on vehicle speed, steering wheel angle, road wheel angle, mass of vehicle, etc. Use of this model is further described below. The VDU table provides a change in road wheel angle relative to steering rack load and vehicle speed. The VDU table may be a three-dimensional (3D) table. In one embodiment, multiple two-dimensional (2D) tables are stored relating change in road wheel angle relative to steering rack load for respective vehicle speeds. As vehicle speed increases, the change in road wheel angle increases. This may be a linear relationship. Interpolation may be performed to determine road wheel angles for vehicle speeds between the vehicle speeds of the 2D tables. An example 2D plot is shown in FIG. 4. FIG. 4 shows an example linear curve relationship between a change in road wheel angle in degrees versus steering rack load in kilonewtons.

Figure 5:
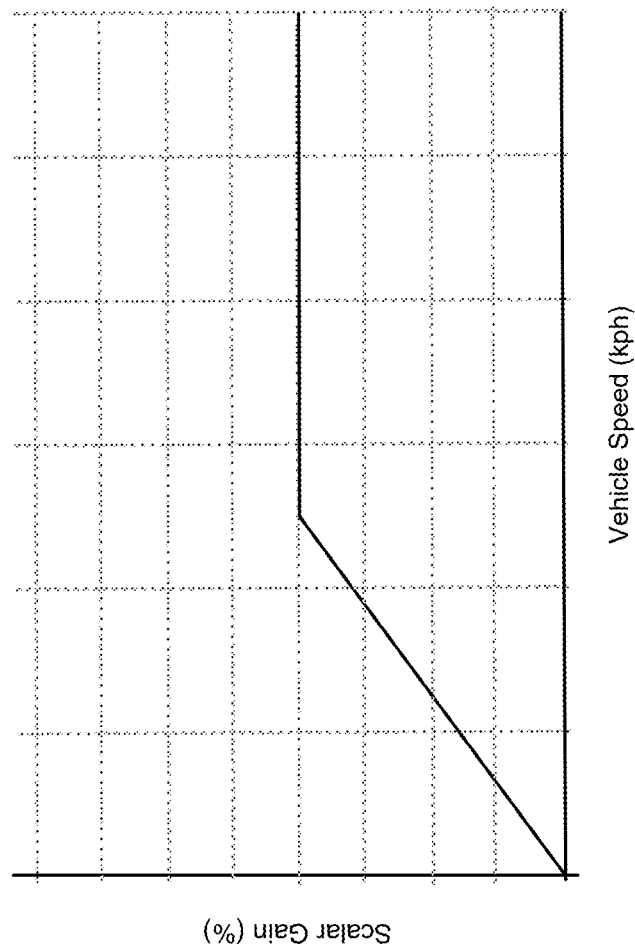
FIG. 5 is a speed based scalar gain plot in accordance with the present disclosure.

The speed based scalar gain table relates scalar gain to vehicle sped. As vehicle speed increases, scalar gain increases up to a certain vehicle speed. An example speed based scalar gain plot is shown in FIG. 5. FIG. 5 shows an example curve of scalar gain percentage versus vehicle speed in kilometers per hour. The scalar gain may increase linearly relative to the vehicle speed until reaching a maximum amount of scalar gain.

Figure 6:
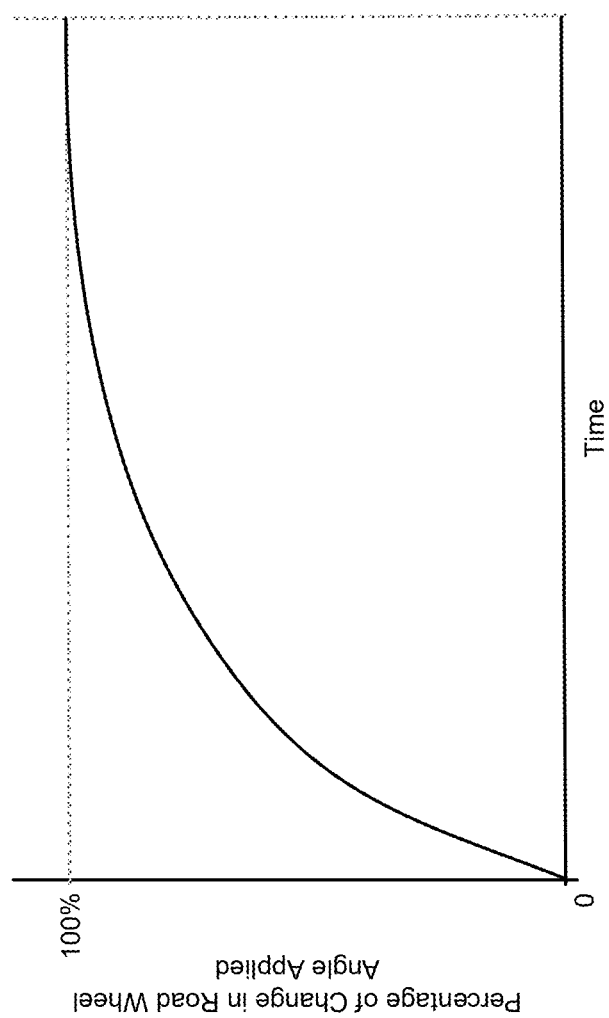
FIG. 6 is a plot of percentage of change in road wheel angle versus time in accordance with the present disclosure.

The first order filter plot may be a percentage of change in road wheel angle applied versus time plot as shown in FIG. 6. The first order filter plot is used to delay change in road wheel angle to match delay in reaction time of passive mechanical devices, such as compliant bushings. Compliant bushings do not react instantaneously, but rather exhibit a build-up in response over time.

The suspension system 212 may be a front suspension system and include the steering rack 220, inner tie rods 240, outer tie rods 242, a sway bar 244, sway bar links 246, and control arms 248. The inner tie rods 240 may be connected to outer tie rods 242 via first bushings 250. The outer tie rods 242 may be connected to wheel assemblies via second bushings (not shown) to turn wheels 251. The sway bar 244 may be held by third bushings 252. The sway bar links 246 may be connected to the sway bar 244 and the control arms 248 via fourth bushings 254. Other bushings may exist, for example at the ends of the outer tie rods 242.

Figure 3:
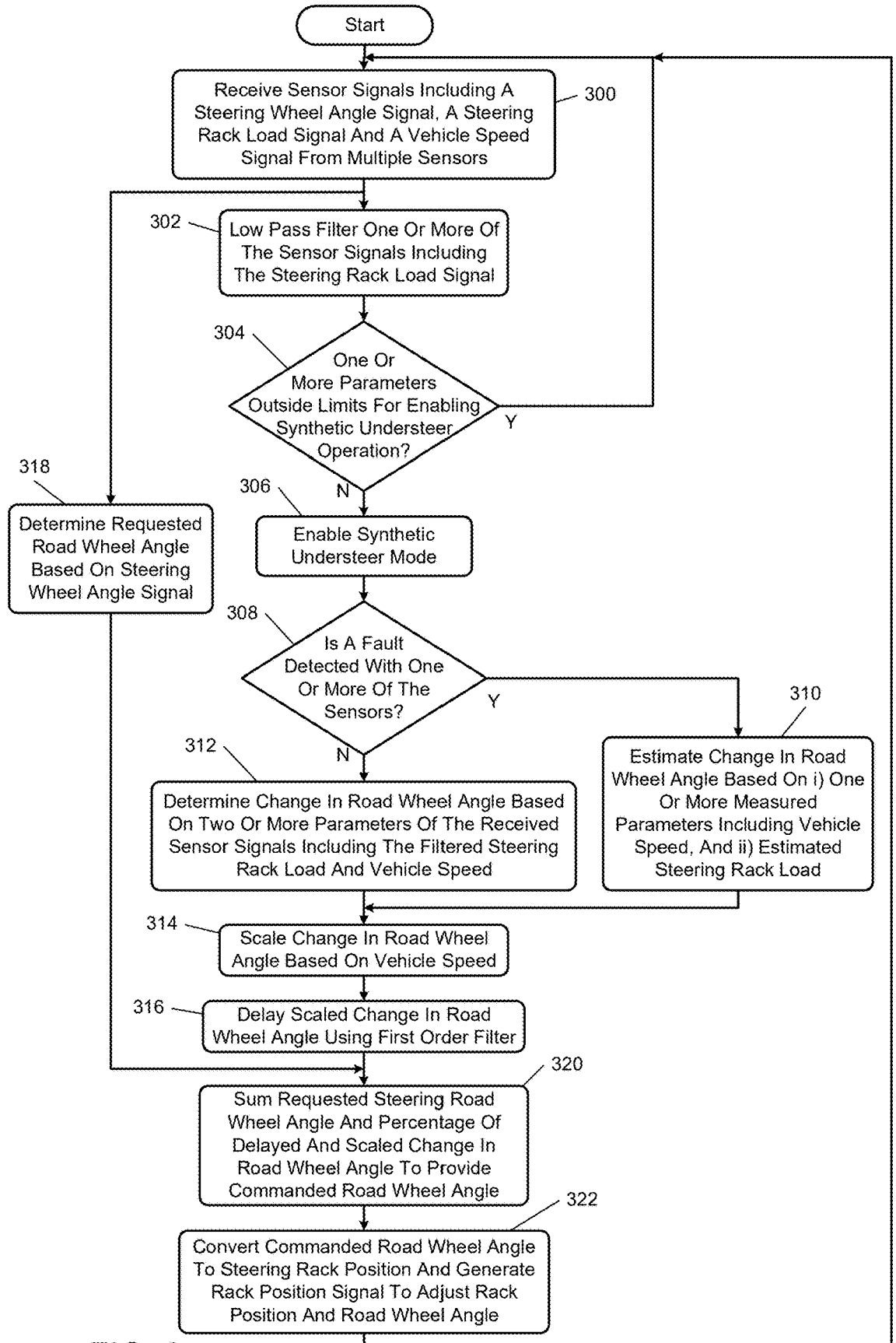
FIG. 3 illustrates an example steer-by-wire method including operation in a synthetic chassis understeer mode in accordance with the present disclosure.

FIG. 3 shows a steer-by-wire method including operation in a synthetic chassis understeer mode. The method may be implemented by the control module 210 of FIG. 2 and are iteratively performed. At 300, the control module 210 receives sensor signals including at least a steering wheel angle signal, a steering rack load signal and a vehicle speed signal. The steering wheel angle signal may be provided by the steering wheel sensor 208. The steering rack load signal may be provided by the force sensor 222. The force sensor 222 may measure force on a shaft, screw, and/or gear of the steering rack 220. The vehicle speed signal may be provided by the vehicle speed sensor 226 or estimated as described above. The control module 210 may also receive sensor signals from the sensors 224 and 228.

At 302, the control module 210 low pass filters one or more of the received sensors signals to remove noise. In one embodiment, the control module 210 low pass filters at least the steering rack load signal output by the force sensor 222.

At 304, the control module 210 determines whether one or more parameters are outside limits for enabling synthetic understeer operation. If yes, operation 300 may be performed, otherwise operation 306 may be performed. The one or more parameters may be steering rack load, vehicle speed, steering wheel angle, longitudinal acceleration, and/or other parameters. As an example, when the steering wheel angle is 0° or greater than a predetermined angle, then the synthetic understeer mode may not be enabled. As another example, when the steering rack load is less than a first predetermined threshold or greater than a second predetermined threshold, then synthetic understeer load may not be enabled.

At 306, the control module 210 enables the synthetic understeer mode to begin determining a change in road wheel angle.

At 308, the control module 210 may determine whether there is a fault with one or more of the sensors, such as a fault with one of the sensors used to determine the change in road wheel angle. The sensors may be any of the sensors 208, 222, 224, 226, 228.

At 310, the control module 210 estimates the change in road wheel angle using the steering rack load model 234 based on i) one or more measured parameters including vehicle speed, and ii) either an estimated steering rack load or a determined steering rack load, depending on which sensor has a fault. Operation 310 of FIG. 3 is shown as if the force sensor 222 has a fault. The one or more measured parameters may additionally include steering wheel angle, steering rack position, longitudinal acceleration, etc. The steering rack load may be estimated based on a dynamics model of the vehicle 200 that is updated in parallel with vehicle operation.

In an embodiment, the steering rack load model corresponds to the vehicle relates steering rack load to certain parameters using equation 1 and/or one or more other equations, where u is vehicle speed, SWA is steering wheel angle, WB is wheelbase length, g is acceleration due to gravity, SR is a steering ratio, TRLG is a tie rod load gradient (i.e., steering rack load produced per g of lateral acceleration), and K is an understeer gradient.

$$\text{Steering Rack Load} = \frac{TRLG * SWA}{\left[\frac{57.3 \text{ g} * WB}{u^2} + K\right]SR} \quad (1)$$

At 312, the control module 210 determines change in road wheel angle based on two or more parameters of the received sensor signals including the filtered steering rack load and the vehicle speed. The two or more parameters may additionally include steering wheel angle, steering rack position, longitudinal acceleration, etc. In an embodiment, the control module 210 determines the change in road wheel angle via a VDU table (or plot). The VDU table relates changes in road wheel angle to at least steering rack load and vehicle speed. When relating road wheel angle to only steering rack load and vehicle speed and when a plot is used, the plot is a 3D plot. The VDU table (or plot) may relate changes in road wheel angle to additional parameters, such as steering rack position, longitudinal acceleration, and/or other relevant parameters. An example 2D plot is shown in FIG. 4 that relates change in road wheel angle to steering rack load. This plot is for a particular vehicle speed and may be different for other vehicle speeds. The VDU table may be an open-loop calibration table and relate changes in steering rack positions to steering rack load and vehicle speed, and may relate the changes in steering rack positions to one or more of the other above-stated parameters. The changes in road wheel angle and steering rack position may be referred to as overlay values, which may be later scaled and delayed as described below.

The VDU table (or plot) is representative of a VDU function, which is used to synthetically alter the effective chassis understeer of the vehicle by providing a change in a road wheel angle in response to a measured steering rack force (or load). Steering rack force (or load), measured in newtons (N) or kilonewtons (kN), may be estimated in real-time based on steering rack motor torque and velocity. The measured steering rack force is used as a basis for determining a change in road wheel angle that alters the effective vehicle understeer in degrees per acceleration due to gravity (deg/g). In an embodiment, this is done independent of steering wheel angle. The stated use of the VDU table (or plot) allows a change in road wheel angle (or steering rack position) to be adjusted independent of steering wheel angle (or position). In another embodiment, steering wheel angle is accounted for and/or one or more other parameters.

In an embodiment, a set and/or selected value is applied to the VDU table to change values of the VDU table. This may be done to limit activation magnitudes at which synthetic chassis understeer is introduced and/or increased. The set and/or selected value may be based on the vehicle speed and be dependent on steering rack position authority limits, such as minimum and maximum positions of the steering rack 220. When applied, the set and/or selected value changes the values of the VDU table to be within the steering rack position authority limits. This may include multiplying the values of the VDU table by the set and/or selected value.

At 314, the control module 210 scales the change in road wheel angle determined at 312 based on vehicle speed. This may be accomplished using, for example, a scalar gain table and/or plot, such as that shown in FIG. 5. The plot of FIG. 5 relates a scalar gain percentage to vehicle speed. In an embodiment, the scalar gain percentage is multiplied by the change in road wheel angle. As the vehicle speed increases the scalar gain percentage increases to a predetermined vehicle speed. The scalar gain table may be an open-loop speed based calibration table.

At 316, the control module 210 delays making a change in a road wheel angle of the vehicle by introducing a calibratable time lag to ensure proper phasing between steering rack force (or load) and steering rack motion execution. In an embodiment, the control module 210 utilizes a first order filter, such as that represented by the plot of FIG. 6 to delay changing the road wheel angle of the vehicle based on the scaled change in road wheel angle determined at 314. The plot of FIG. 6 is percentage of change in road wheel angle applied versus time. The first order filter may be referred to as a 1/sT type delay filter to provide time lag from when the scaled change in road wheel angle is determined to when the scaled change in road wheel angle is applied. As time passes, the percentage of the change in the road wheel angle that is applied increases from 0% to 100%.

At 318, the control module 210 determines a requested road wheel angle based on the steering wheel angle signal. At 320, the control module 210 sums the requested steering wheel angle and the percentage of delayed and scaled change in road wheel angle to provide a commanded road wheel angle. At 322, the control module 210 converts the commanded road wheel angle to a steering rack position and generates a steering rack position signal to adjust the position of the steering rack 220 and thus road wheel angle.

The above-described examples change road wheel angle of a vehicle based on steering rack load (or force) and vehicle speed. The change in road wheel angle may also be based on other parameters such as steering rack position and longitudinal acceleration. Real-time steering rack force measurements are taken to alter road wheel angle of wheels of a steering system. The amount of vehicle understeer in degrees per g of acceleration is altered based on vehicle speed.

The examples disclosed herein introduce and/or increase understeer to improve steering sensitivity measured in g/deg, vehicle lateral acceleration response time in seconds, critical speed to provide a stable handling range in kph, yaw damping percentage, driver controllability, and trailering performance. Increasing understeer improves the amount of yaw dampening by reducing the responsiveness of the vehicle to reduce the amount of overshoot and undershoot when turning. The driver controllability is improved because the driver is able to intuitively react to vehicle behavior when turning due to the presence of understeer.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer configured to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A steer-by-wire system of a vehicle, the steer-by-wire system comprising:
   a plurality of sensors configured to detect a plurality of parameters including at least one of a steering rack load on a steering rack of the vehicle and a speed of the vehicle; and
   a control module configured to operate in a synthetic chassis understeer mode including i) determining a change in road wheel angle based on the plurality of parameters, and ii) based on the change in the road wheel angle, controlling a motor to adjust a position of the steering rack to at least one of introduce and increase understeer.

2. The steer-by-wire system of claim 1, wherein the control module is configured to determine whether to operate in the synthetic chassis understeer mode based on the plurality of parameters.

3. The steer-by-wire system of claim 1, wherein the control module is configured to determine the change in the road wheel angle based on the steering rack load and the speed of the vehicle.

4. The steer-by-wire system of claim 1, wherein the control module is configured to estimate the steering rack load based on a steering wheel angle, the speed of the vehicle, and mass of the vehicle.

5. The steer-by-wire system of claim 1, further comprising a steering rack load sensor configured to detect the steering rack load on the steering rack.

6. The steer-by-wire system of claim 1, wherein the control module is configured to sum a steering wheel angle request with the change in the road wheel angle to provide an adjusted road wheel angle, and convert the adjusted road wheel angle to a target position for the steering rack.

7. The steer-by-wire system of claim 1, wherein the control module is configured to determine the change in the road wheel angle based on at least one of a virtual deflection understeer table and a virtual deflection understeer plot.

8. The steer-by-wire system of claim 7, wherein the control module is configured to adjust values of the at least one of the virtual deflection understeer table and the virtual deflection understeer plot based on the speed of the vehicle and steering rack position authority limits.

9. The steer-by-wire system of claim 1, wherein the control module is configured to adjust the change in the road wheel angle based on a scalar gain percentage, the scalar gain percentage being set based on the speed of the vehicle.

10. The steer-by-wire system of claim 1, wherein the control module is configured to delay adjusting the position of the steering rack using a first order filter.

11. A method of operating a steer-by-wire system of a vehicle, the method comprising:
   detecting a plurality of parameters including at least one of a steering rack load on a steering rack of the vehicle and a speed of the vehicle; and
   operating in a synthetic chassis understeer mode including i) determining a change in road wheel angle based on the plurality of parameters, and ii) based on the change in the road wheel angle, controlling a motor to adjust a position of the steering rack to at least one of introduce and increase understeer.

12. The method of claim 11, further comprising determining whether to operate in the synthetic chassis understeer mode based on the plurality of parameters.

13. The method of claim 11, further comprising determining the change in the road wheel angle based on the steering rack load and the speed of the vehicle.

14. The method of claim 11, further comprising estimating the steering rack load based on a steering wheel angle, the speed of the vehicle, and mass of the vehicle.

15. The method of claim 11, further comprising detecting the steering rack load on the steering rack via a steering rack load sensor.

16. The method of claim 11, further comprising:
   summing a steering wheel angle request with the change in the road wheel angle to provide an adjusted road wheel angle; and
   converting the adjusted road wheel angle to a target position for the steering rack.

17. The method of claim 11, further comprising determining the change in the road wheel angle based on at least one of a virtual deflection understeer table and a virtual deflection understeer plot.

18. The method of claim 17, further comprising adjusting values of the at least one of the virtual deflection understeer table and the virtual deflection understeer plot based on the speed of the vehicle and steering rack position authority limits.

19. The method of claim 11, further comprising adjusting the change in the road wheel angle based on a scalar gain percentage, the scalar gain percentage being set based on the speed of the vehicle.

20. The method of claim 11, further comprising delaying adjustment of the position of the steering rack using a first order filter.

* * * * *